May 21, 1946.  W. A. ROSEBERRY  2,400,783
DRILL GRINDER ATTACHMENT FOR MACHINE TOOLS
Filed May 3, 1944
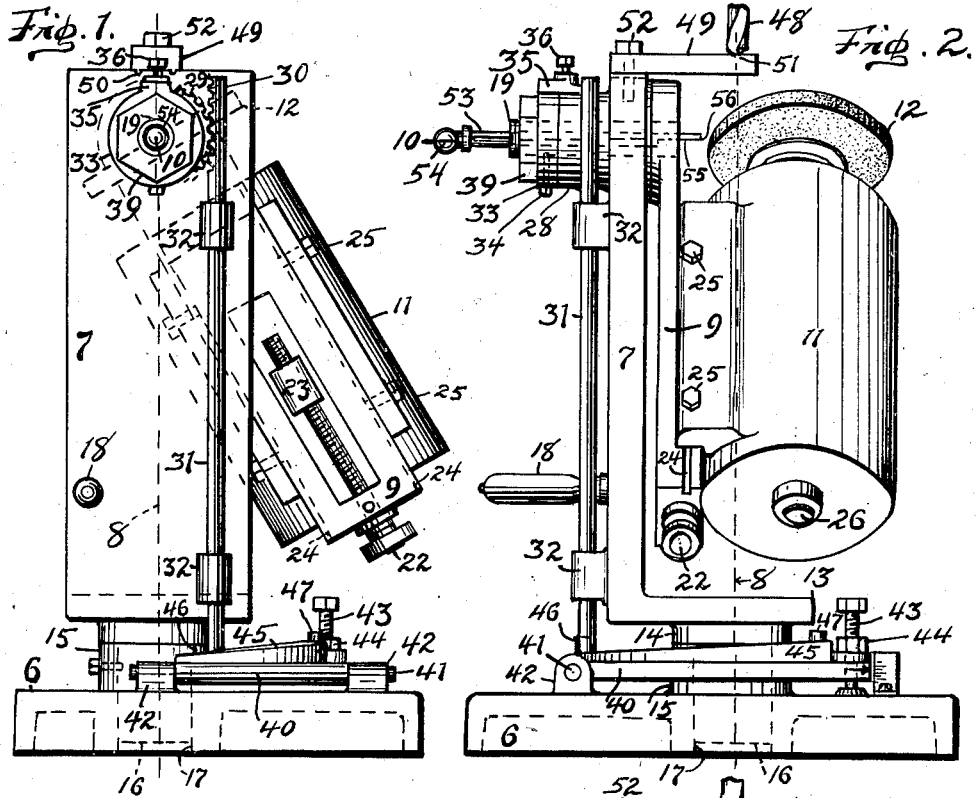
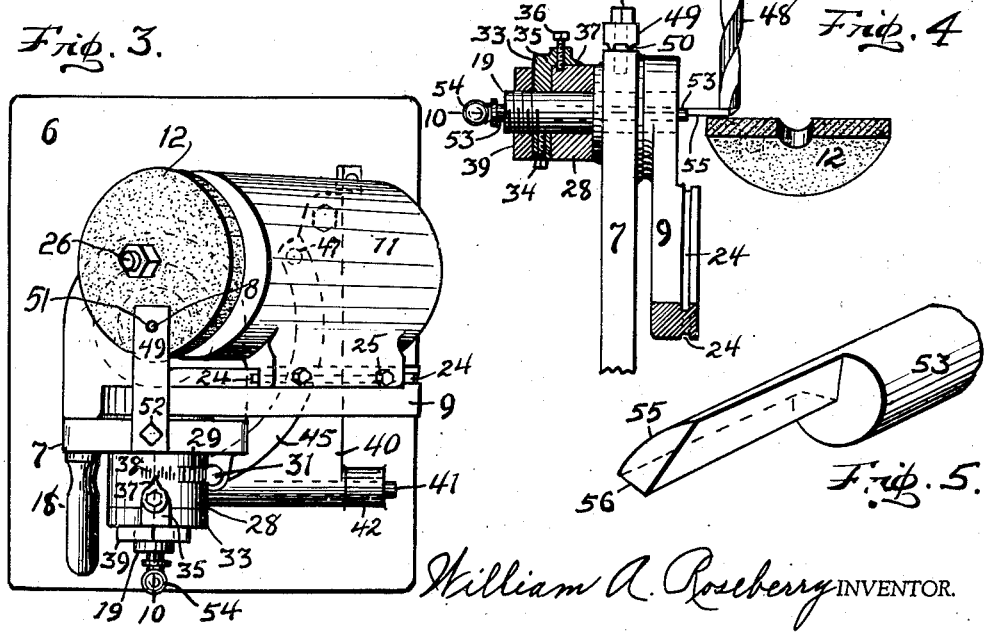
William A. Roseberry INVENTOR.
BY A. G. Burns, attorney Patented May 21, 1946

2,400,783

UNITED STATES PATENT OFFICE 2,400,783

DRILL GRINDER ATTACHMENT FOR MACHINE TOOLS

William A. Roseberry, Fort Wayne, Ind.

Application May 3, 1944, Serial No. 533,831

7 Claims. (Cl. 51—241)

This invention relates to improvements in a drill grinder attachment for machine tools, such as a drill press or other machine by which drilling operations are performed and wherein a tool of the twist drill type is employed.

An object of the invention is to provide a portable appliance that is readily applicable to a drilling machine having a drill, by which to accurately dress the cutting edges of the drill while the drill is held in its normal operating position in the drilling machine.

Another object of the invention is to construct the grinder in such manner as to effect dressing of the cutting edge of the drill and reduce the surfaces of the drill adjacent the cutting edges thereof progressively to effect a predetermined degree of clearance according to adjustment of the grinder attachment.

Another object of the invention is to provide a drill grinder applicable to a drill while the drill is mounted in its normal operating position in a machine tool, having means of adjustment by which to control the angle of the grinding operation as it is applied to the drill and to vary the angularity thereof progressively to effect uniform clearance.

And a further object of the invention is to construct the grinder and arrange it in connection with a drilling machine, so the opposite wings of a drill, while mounted in normal operating position, are ground with like angularity at the cutting edges thereof and with clearance of the same degree.

Other objects and advantages of the invention appear in the following description.

An illustrative embodiment of the invention is shown in the accompanying drawing, in which:

Fig. 1 is a front elevational view of a structure in which the invention is incorporated;

Fig. 2 is a side elevational view of the structure projected from Fig. 1;

Fig. 3 is a top plan view of the structure projected from Fig. 1;

Fig. 4 is a side elevational fragmentary view of the structure projected from Fig. 2, parts being shown in section; and Fig. 5 is a detail perspective fragmentary view of a gauge used for adjusting the appliance to a drill to be ground.

The illustrative embodiment of the invention consists of a stationary supporting base 6, an upright standard 7 mounted upon the base for rotation about a definite axis indicated by 8, a swinging frame 9 mounted on the standard for movement about an axis, indicated by 10, that intersects the axis 8 at right angles thereto, a motor 11 supported on the swinging frame 9 provided with a grindstone 12, and motion transmitting mechanism in conjunction with the base and standard, operatively connected with the swinging frame, by which the frame is caused to swing concurrently with turning movement of the standard. Features of adjustment for the related movable parts hereinafter set forth also form part of the invention.

The standard 7 has a foot 13 provided with an axial boss 14 that rests upon a tubular projection 15 on the base 6 and has a pendent stud 16 that extends into a bore 17 made in the base by which the standard is secured on the base so as to have turning movement about the axis 8. The standard is provided with a handle 18 by which turning movement is imparted thereto.

In the upper end portion of the standard 7 is journaled a shaft 19 upon the inner end of which is secured the swinging frame 9 that depends in a plane parallel with the inner face of the standard 7 and has adjustably mounted thereon the electric motor 11, there being provided in the frame an adjusting rod 22 that is threaded in a lug 23 that projects from the motor. The sides of the frame have longitudinal grooves 24, made therein for the reception of the inner ends of guide-screws 25 on the motor by means of which the motor is held adjustably in connection with the swinging frame. By turning the rod 22 the motor is moved longitudinally relative to the frame. The shaft 26 of the motor has secured upon its upper end the grindstone 12 the upper face of which is positioned in the plane of the transverse axis 10 about which the frame swings. The axis of the motor-shaft 26 lies in a plane parallel with that of the standard axis 8 and intersects the axis 10 for the frame. The plane of the upper or cutting face of the grindstone 12 preferably is disposed to meet the intersection of the axis of the standard and frame 8 and 10 respectively. This is accomplished by manipulation of the adjusting rod 22.

Upon the forwardly projecting portion of the shaft 19 is mounted a collar 28 so as to have adjustable rotary movement relative thereto, and has an arcuate series of teeth 29 on its periphery engaged by a corresponding series of teeth 30 made in a thrust-bar 31 that is mounted in bearings 32 on the standard, so that rotary movement is imparted to the collar more or less according to axial movement of the thrust-bar.

A dog 33 is secured on the shaft 19 by means of a set-screw 34 so as to have turning movement therewith, and is provided with a lug 35 that overhangs the perimeter of the collar 28. A set-screw 36 in the lug has locking engagement with the collar in various positions when tightened accordingly as the collar is adjustably turned relative to the dog. The inner end of the lug 35 is provided with a pointer 37 that overhangs the adjacent face of the collar on which there is made a graduated scale 38.

A nut 39 threaded on the outer end of the shaft 19 serves to confine the assembled dog, collar and swinging frame in position relative to the standard.

On the base 6 there is mounted a tilting platform 40 secured thereon at one end by a shaft 41 supported in lugs 42 on the base and is provided at its free end with an adjusting screw 43 the lower end of which bears on the base, there being provided a lock-nut 44 for holding the screw in adjusted positions. By manipulation of the screw 43 the platform is adjustably tilted angularly upon the axis of the shaft 41. The platform has on its upper face an inclined arcuate cam 45 that has curvature concentric with the axis 8 upon which the standard turns, and the lower end of the thrust-bar 31 rides upon the top face of the cam, so that turning movement of the standard 7 about its axis 8 is accompanied by vertical movement of the thrust-bar and consequent swinging movement of the frame 9 through the medium of the toothed collar 28, dog 33 and shaft 19. Stops 46—47 project upwardly from the cam 45, one at each end thereof, and having engagement with the lower end of the thrust-bar 31 to limit the oscillatory movement of the standard.

As a means for centering the apparatus for operation in a drill press of the ordinary type (not shown) having a bed-plate and a spindle provided with a chuck in which a drill 48 is secured, there is arranged an arm 49 positioned on the top of the standard 7 having on its lower face one or more tongues 50 that fit into corresponding grooves in the top of the standard when the arm is turned so its outer portion extends across the axis 8 about which the standard moves, thus to sustain the arm in operating position. A centering mark or cavity 51 is made in the upper face of the arm so as to become alined with the axis 8 when the arm is moved into centering position. The arm is held adjustably in place on the standard by means of a cap-screw 52.

It is desirable that the drill be adjusted preparatory to the grinding operation and supported so that the cutting edges extend substantially at right angles to the axis 10 on which the frame 9 swings, and to insure proper positioning of the drill there is provided a gauge consisting of a stem 53 that extends axially through the shaft 19 with which it is splined for longitudinal movement therein. The forward end of the stem has an operating knob 54, and the rear end of the stem protrudes beyond the frame 9 and has an extending finger 55 with a terminal edge 56 disposed in a plane parallel with that of the grinding face of the stone 12 and extends at right angles to the axis of the stem. Thus, when the stem is manipulated and the finger is moved into drill engaging position, the operator is enabled by adjustably turning the drill to cause the terminal edge 56 to register accurately against the cutting edge of one of the wings of the drill that traverses the finger end. When the cutting edge of the drill and terminal edge of the finger register precisely parallel with each other, the drill then is in proper position for the subsequent grinding operation. After one wing shall have been dressed, the drill is adjustably turned so that its opposite wing is brought into contact with the finger in proper position to be likewise dressed.

Operation

In using the invention, the apparatus is placed upon the bed-plate of the drill press and moved thereon to such position that upon lowering of the drill while attached in connection with the drill press spindle, the drill point is centered in the cavity 51 in the arm 49, after which the drill is manually raised and the arm 49 swung out of operating position. The drill 48 is then lowered into actual contact with the grinding face of the stone 27 and turned upon its axis until the edge of one wing of the drill contacts the terminal edge of the gage finger. The drill is then held in its adjusted position by any suitable means to prevent turning thereof, such as by locking the drill press spindle against rotation. The stone 12 is then set in motion by means of the motor to cause grinding of the contacting face of the drill point. During the grinding operation, by manipulation of the handle 18 the standard 7 is turned upon its axis 8 causing travel of the thrust-bar 31 over the cam 45 from its initial position against the stop 46 to the stop 37 which results in concurrent upward movement of the thrust-bar and swinging movement of the frame 9 with consequent progressive tilting movement of the grindstone 12. In this manner the depth of the grinding action on the contacting face of the drill point is increased gradually from the cutting edge of the drill by which is afforded more or less clearance for the drill point.

The amount of clearance as may be required is effected by manipulation of the adjusting screw 43 by which the slant of the cam 45 is predisposed.

After one face of the drill point has thus been dressed, the drill is adjustably turned and the opposite face is then subjected to like treatment. In this manner the faces of the ends of both wings are ground precisely alike and efficient performance of the drill assured.

Variations from the particular construction above disclosed may be resorted to by the exercise of skill in the art, without departure from the scope of the invention, and the following claims are intended to be inclusive of such variations.

What I claim is:

1. A drill grinding attachment for a machine tool in which a twist drill is used, said attachment consisting of a base, a standard mounted upon the base for movement thereof about a definite axis, a shaft journaled in the standard the axis of which extends at right angles to and intersects the standard axis, a swinging frame mounted upon said shaft, a motor carried by said frame provided with a grindstone the grinding face of which lies in a plane that angularly intersects the shaft axis, a collar loosely mounted on said shaft provided with a toothed segment, a dog secured on said shaft provided with means for locking engagement with said collar in selected positions, a movable arm on the standard for centering the attachment in the machine tool in axial alinement with its drill respecting the axis for said standard, a gauge the stem of which extends axially through said shaft, having splined relation therewith, provided with a finger engageable with one wing of the drill when the drill is moved into contact with said grindstone, a tilting platform mounted on said base having an adjusting screw therefor, provided with an arcuate cam with a stop at each end thereof, a thrust-bar carried by said standard, one end of which rests on the cam and its other end having toothed engagement with said segment, the arrangement being such that turning movement of the standard upon its axis is accompanied by rocking movement of said frame through the medium of the collar, dog and said shaft with consequent tilting of the grindstone, and an operating handle for manipulating the standard.

2. A machine tool attachment for grinding a twist drill while in place therein, said attachment having a base, a standard mounted upon the base for movement about a definite axis, a frame mounted upon said standard having swinging movement relative thereto about an axis extending at right angles to and intersecting the standard axis, a motor-driven grindstone carried by the frame, a tilting platform mounted on said base provided with adjustable means to support said platform in selected positions and provided with an arcuate cam concentric with the standard axis, a stop on each end portion of said cam, a thrust-bar carried by said standard, one end of which rests on said cam and rides thereon between its stops, mechanism in connection with the thrust-bar and said frame, the arrangement being such that turning movement of the standard upon its axis is accompanied by rocking movement of said frame and consequent tilting of said grindstone, adjusting means on said frame to move said grindstone into a selected position relative to the frame axis, a movable arm on the standard having a cavity therein for centering the attachment in the machine tool in axial alinement with said drill and the axis for said standard, and a gauge adjustably mounted in connection with the attachment provided with a finger engageable with one wing of said drill when the drill is moved into contact with the grindstone.

3. A machine tool attachment for grinding a twist drill while in place therein, said attachment having a base, a standard mounted upon the base for movement about a definite axis, a frame mounted upon said standard having swinging movement relative thereto about an axis extending at right angles to and intersecting the standard axis, a motor-driven grindstone carried by the frame, a tilting platform mounted on said base provided with adjustable means to support said platform in selected positions and provided with an arcuate cam concentric with the standard axis, a stop on each end portion of said cam, a thrust-bar carried by said standard, one end of which rests on said cam and rides thereon between its stops, mechanism in connection with the thrust-bar and said frame, the arrangement being such that turning movement of the standard upon its axis is accompanied by rocking movement of said frame and consequent tilting of said grindstone, adjusting means on said frame to move said grindstone into a selected position relative to the frame axis, and a movable arm on the standard having a cavity therein for centering the attachment in the machine tool in axial alinement with said drill and the axis for said standard.

4. A machine tool attachment for grinding a twist drill while in place therein, said attachment having a base, a standard mounted upon the base for movement about a definite axis, a frame mounted upon said standard having swinging movement relative thereto about an axis extending at right angles to and intersecting the standard axis, a motor-driven grindstone carried by the frame, a tilting platform mounted on said base provided with adjustable means to support said platform in selected positions and provided with an arcuate cam concentric with the standard axis, a stop on each end portion of said cam, a thrust-bar carried by said standard, one end of which rests on said cam and rides thereon between its stops, mechanism in connection with the thrust-bar and said frame, the arrangement being such that turning movement of the standard upon its axis is accompanied by rocking movement of said frame and consequent tilting of said grindstone, and a gauge adjustably mounted in connection with the attachment provided with a finger engageable with one wing of said drill when the drill is moved into contact with the grindstone.

5. A machine tool attachment for grinding a twist drill while in place therein, said attachment having a base, a standard mounted upon the base for movement about a definite axis, a frame mounted upon said standard having swinging movement relative thereto about an axis extending at right angles to and intersecting the standard axis, a motor-driven grindstone carried by the frame, a tilting platform mounted on said base provided with adjustable means to support said platform in selected positions and provided with an arcuate cam concentric with the standard axis, a stop on each end portion of said cam, a thrust-bar carried by said standard, one end of which rests on said cam and rides thereon between its stops, mechanism in connection with the thrust-bar and said frame, the arrangement being such that turning movement of the standard upon its axis is accompanied by rocking movement of said frame and consequent tilting of said grindstone, and adjusting means on said frame to move said grindstone into a selected position relative to the frame axis.

6. A drill grinding attachment for machine tool of the drill press type, said attachment consisting of a base, a standard having turning movement on the base, a frame supported by the standard having swinging movement relative thereto, an arcuate cam member, concentric with the axis of the standard, pivoted on the base and provided with adjusting means to support said member in selected positions, a mechanism connectedly related with said cam member and the swinging frame whereby turning movement of the standard is accompanied by swinging movement of said frame, a motor-driven grindstone element carried by said frame, means in connection with the frame and said element to adjust the grindstone relative to the axis for said frame, and a gauge adjustably supported on the attachment engageable with a drill, operatively positioned in said machine tool, wherefore to facilitate centering the attachment in the machine tool relative to the axes of the drill and said standard.

7. An attachment for grinding the drill of a machine tool while operatively disposed therein, said attachment having a base, a standard mounted on the base having turning movement about a definite axis and provided with an operating means therefor, a frame supported by the standard to have swinging movement about an axis that extends at right angles to and intersects the standard axis, an element carried by said frame having a motor-driven grindstone an active face of which is disposed in a plane that angularly intersects the frame axis, an adjustable tilting arcuate cam on the base concentric with the standard axis, and a mechanism having actuating connection with said frame having a part that bears on said cam and rides thereon, wherefore turning movement of the standard on the base is accompanied by swinging movement of said frame.

WILLIAM A. ROSEBERRY.